United States Patent [19]

Nayak

[11] 4,365,986

[45] Dec. 28, 1982

[54] FURNACE DELIVERY SYSTEM

[75] Inventor: Ashok L. Nayak, Corning, N.Y.

[73] Assignee: Corning Glass Works, Corning, N.Y.

[21] Appl. No.: 244,001

[22] Filed: Mar. 16, 1981

[51] Int. Cl.³ ............................................. C03B 5/033
[52] U.S. Cl. ......................................... 65/136; 65/128;
 65/137; 65/326; 65/327; 65/356
[58] Field of Search ................. 65/126, 128, 135, 136,
 65/137, 326, 327, 348, 356, 134

[56] References Cited

U.S. PATENT DOCUMENTS

| 2,038,627 | 4/1936 | Badger | 65/135 X |
|---|---|---|---|
| 2,282,554 | 5/1942 | Barker, Jr. | 65/137 X |
| 2,861,596 | 2/1956 | Ipsen . | |
| 2,993,079 | 4/1957 | Augsburger . | |
| 3,268,321 | 8/1966 | Chapman | 65/326 X |
| 3,519,412 | 7/1970 | Olink | 65/135 X |
| 3,524,206 | 4/1968 | Boettner et al. . | |
| 3,583,861 | 9/1961 | Preston . | |
| 3,635,444 | 9/1970 | Potter . | |
| 3,725,558 | 5/1971 | t'Serstevens . | |
| 3,742,111 | 1/1972 | Pieper . | |
| 3,942,968 | 11/1974 | Pieper . | |
| 4,029,887 | 4/1976 | Spremulli . | |
| 4,143,232 | 11/1976 | Bansal et al. . | |

FOREIGN PATENT DOCUMENTS

1412599 12/1972 United Kingdom .

Primary Examiner—Arthur D. Kellogg
Attorney, Agent, or Firm—John P. DeLuca

[57] ABSTRACT

A glass delivery system is disclosed having a central glass conducting pipe enclosed within a heat exchange structure. Heat shields reflect energy back to the pipe for reducing heat losses from the pipe and heaters are located about the pipe to add heat energy as required. Heaters which may be immersed in surrounding glass, are provided externally of the pipe at connections into and out of the pipe, and a bellows arrangement for accommodating expansion due to thermal cycling is provided in at least one of such connections. In a preferred embodiment, oxidizable refractory metals are used which may be protected from contamination by providing inert or reducing purging atmospheres or vacuum. Heat losses may also be regulated by atmospheric control of the purging atmosphere as well as control of a working fluid for the heat exchange structure. Means may be provided for shielding or insulating refractory components from intense radiation. Connectors are provided for modularizing the system and simplifying placement and removal thereof.

54 Claims, 7 Drawing Figures

FURNACE DELIVERY SYSTEM

BACKGROUND OF THE INVENTION

The present invention relates to a delivery system for conditioning and conveying molten thermoplastic material produced in a melting furnace. The delivery system receives the thermoplastic material from the furnace and discharges it at some desired temperature and consistency for forming a product. The invention more particularly pertains to a glass delivery system wherein the glass is conditioned to a desired relatively uniform temperature and viscosity by means of a heat exchange device for efficiently and economically removing heat from the glass as it passes therethrough.

Vertically oriented electric glass melting furnaces have been known in the prior art for some time, but it has been only in the last several years that such furnaces have been brought to large scale commercial application. In more recently developed furnaces, such as the type illustrated in U.S. Pat. Nos. 2,993,079, 3,524,206, 3,583,861, 3,725,558, 3,742,111, 3,942,968, 4,029,887 and 4,143,232, glass forming batch materials are fed to the upper end of a vertical chamber and refined molten glass is withdrawn from the bottom of the chamber. High quality glass is thus produced in a single vertical chamber, with melting occurring in an upper portion thereof and preferably some refining occurring at the bottom portion.

The molten glass withdrawn from the electric furnace is usually received within a laterally extending connected channel situated aside the furnace near the bottom and thereafter is usually directed through a vertical passageway or riser to a mixing chamber and/or a forehearth. For example in U.S. Pat. No. 3,942,968 to Pieper, the molten glass is withdrawn laterally from the furnace through a connected channel, thereafter is directed to a riser portion where colored materials may be added, from the riser to a downwardly extending mixing chamber, laterally from the chamber through a second connected channel, then upwardly through a second riser, and finally to a forehearth or feeder. In the Pieper system, the delivery passageway extending from the furnace bottom is formed in refractory block material of the contiguous walls of the furnace and riser, and an electrode is positioned in the passageway. It will be appreciated by those skilled in the art of melting glass that the passageway electrode may not be used when coalesced forming or batch material surrounds the electrode because the cold material will not be electrically conductive.

In some electric glass melting furnaces heretofore employed, a refractory metal delivery conduit extends from near the center of the bottom of the furnace to the confines or passageway of the connected channel. The conduit is either placed on the furnace bottom wall or is laid into a trough incorporated in the furnace bottom wall, and the conduit is protected from exposure to solid or liquid contaminants, which originate in the batch and sink through the molten glass, by a cover or refractory block. The delivery system of such type of prior art furnace is provided with devices for heating the cold glass or raw material initially within the conduit because, during the startup or beginning stage of operation of the furnace, the heat conducted through the conduit from the molten glass in the furnace and connected channel to the glass or raw materials is not sufficient to melt all the cold batch material initially within the conduit.

In the U.S. Pat. No. 4,029,887 to Spremulli, an apparatus was disclosed for heating glass or raw materials within a delivery conduit extending from an electric glass melting furnace to a connected channel. The conduit was made of an electrically conductive refractory material such as molybdenum (moly) and was used to conduct current from inside the furnace to its exit end in the channel. Joule effect heating between the exit end of the conduit and the electrode in the connected channel indirectly caused the cold glass or raw materials within the conduit to partially melt, to the extent that the materials within the conduit would begin to flow therefrom. A flange assembly for use with the molybdenum conduit was also disclosed. In the Spremulli patent, herein briefly described, the delivery conduit connected the furnace with a forehearth channel wherein the glass would be conditioned for delivery to an outlet end thereof and a forming means.

In the British Pat. No. 1,412,599 commonly assigned to the assignee herein, a delivery system utilizing stationary mixing devices and a heat exchange vessel, is disclosed. The system does not consider the problem of high heat loss since it is located downstream of the forehearth in a forming operation.

It is well known in the art that forehearths require substantial amounts of heat energy in order to condition the glass from the furnace temperature at the inlet to some desired forming temperature and viscosity at the outlet thereof. Thus the forehearth is a net consumer of energy and the anomalous condition exists wherein a large amount of heat energy is required to "cool" the glass to the proper forming temperatures.

It is also known that molybdenum, a preferred glass contact material used herein, has significantly higher wear resistance to moving molten glass than conventional refractory materials. However, it is also well known that molybdenum tends to oxidize at temperatures in excess of 550°-600° C. and thus the molybdenum must be protected from deleterious atmosphere (oxygen) when it is used at or above these elevated temperatures. In Spremulli, '887 for example, the outlet pipe used therein was described as being manufactured from molybdenum components and various protection devices were included therein including cooling means and purge gas inlets for those portions of the molybdenum pipe that were susceptible to oxidation from the ambience. The Spremulli system, however, still required the use of a forehearth channel for cooling the glass.

The present invention performs the functions of transportation, cooling, and homogenizing molten glass, wherein the useful life of the delivery system is significantly increased and glass-refractory corrosion products, producing glass inhomogeneity are eliminated. Further, the system greatly reduces the net energy required to condition the glass.

SUMMARY OF THE INVENTION

A delivery system for conducting molten thermoplastic material from a furnace and delivering the material at a desired homogeneity to a remote outlet includes a pipe member having an inlet adapted to receive the material at one end from the furnace and a remote outlet for delivering the same. A shell structure located about the pipe defines a closed space thereabout. Heat shields are located in the closed space surrounding the pipe for reflecting back heat radiation therefrom. The shell structure includes closed circuit heat exchange passages for circulation of a heat exchange fluid therethrough which removes some of the heat from the thermoplastic material which is transferred to the fluid by convection and radiation. Means is included for introducing a gaseous fluid within the closed space between the shell structure and the pipe. The gaseous fluid acts as a heat conducting medium and, under certain conditions, it may act as an inert atmosphere or purge gas for protecting certain components of the system from deleterious ambience. The space may be evacuated if desired.

There may also be provided inlet and outlet connector means including heating elements and shields adapted to operate while immersed in the thermoplastic material.

DESCRIPTION OF THE DRAWINGS

Wall thicknesses are not always shown in the above drawings since the illustrations are schematic in nature. Sometimes heavy lines are used to emphasize a pipe or structure wall thickness where cross hatching is thought to confuse the drawing.

In a series of copending U.S. patent applications, Serial Nos. 243,811; 242,022; 244,024 filed this same date and assigned to the assignee herein, various examples of glass melting and conditioning systems are disclosed and, to the extent necessary, the teachings of such disclosures should be considered incorporated herein by reference.

DESCRIPTION OF THE PREFERRED EMBODIMENTS

Figure 1:
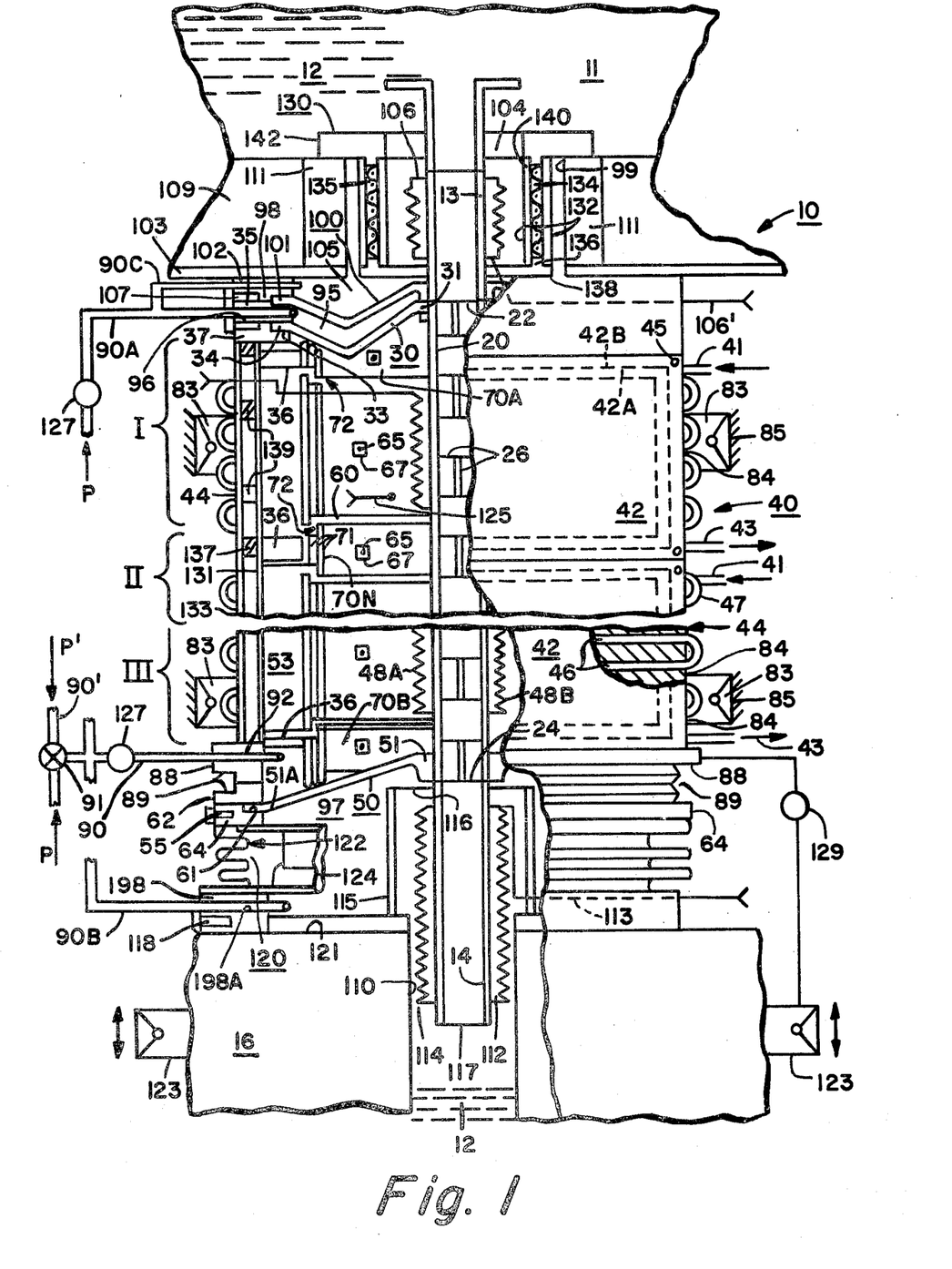
FIG. 1 is a fragmented schematic cross-sectional elevation of the delivery system of the present invention.
Figures 2, 4:
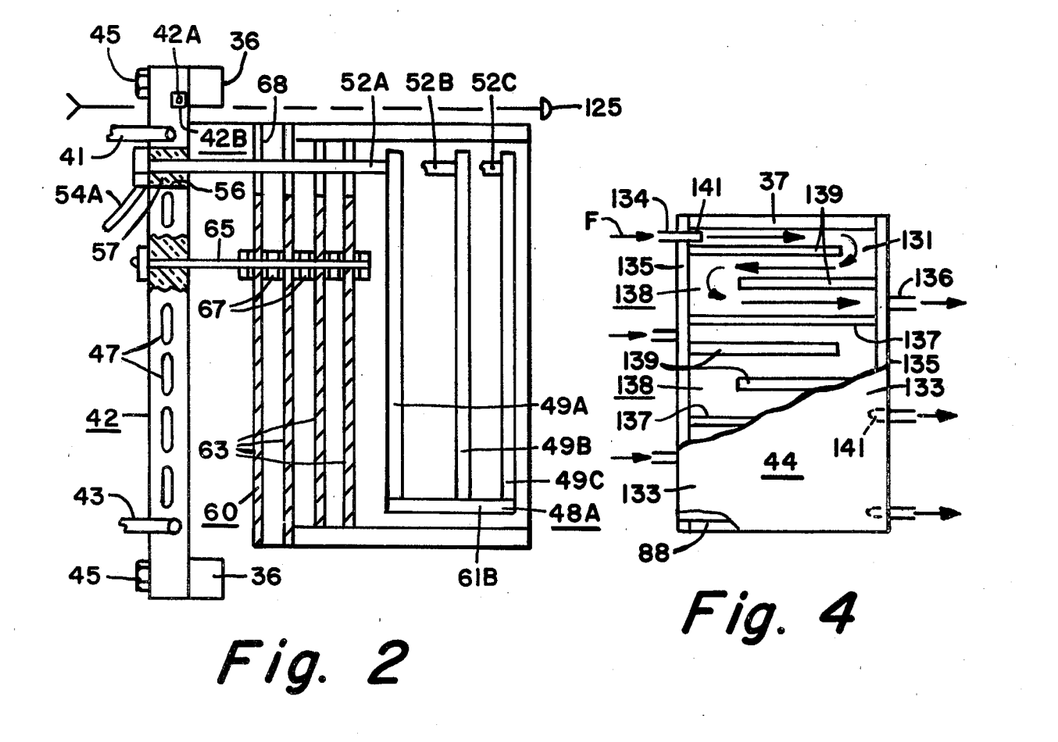
FIG. 2 is a schematic cross section of one removable heat exchange panel with its associated equipment.
FIG. 4 is a detail of a cooled outside wall structure.
Figure 3:
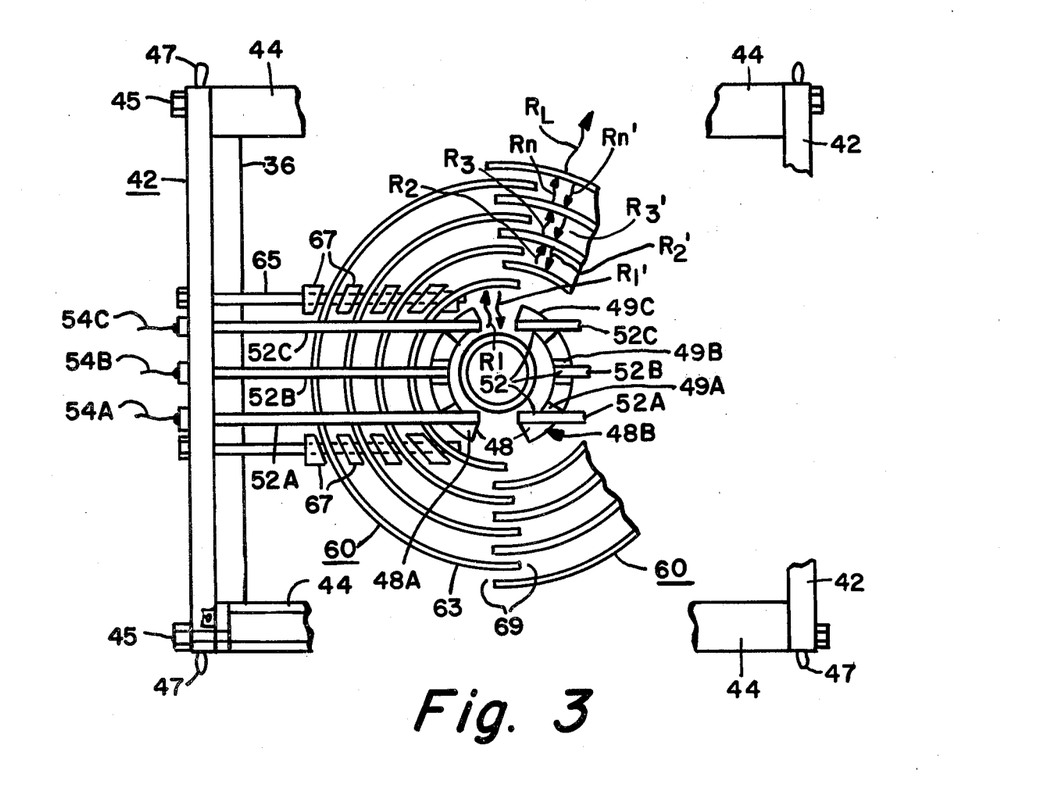
FIG. 3 is a fragmented schematic top sectional view of the heat exchange panel of FIG. 2 with portions of the delivery system included to illustrate the environment and spacial relation thereof with other components.

Referring to FIGS. 1-3 there is illustrated a conditioning and delivery system 10 adapted to receive a supply of molten thermoplastic material such as glass 12 via an upper connector 13 from a furnace 11, not detailed herein, but preferably of the type disclosed in U.S. patent application Ser. No. 243,811, referred to above. A pipe 20, preferably fabricated from molybdenum (moly), is loosely sleeved, butted or otherwise mated at its inlet end 22 with an outlet of the upper connector 13. The pipe 20, forming a flow path or conduit, receives molten glass 12 at its inlet end 22 and delivers the glass 12 from a lower outlet end 24 thereof. Heat exchange with the glass 12 occurs through the walls of pipe 20.

A plurality of axially aligned mixer elements 26 may be provided within the pipe 20 for enhancing heat exchange with the glass 12 through the pipe 20 and physically homogenizing the glass 12 as it passes therethrough. U.S. Pat. No. 2,861,596 and 3,635,444, describe various types of mixer elements which could be used. However, in the present invention, each mixer element 26 may be a flat rectangular plate, aligned axially with an adjacent one, but offset 90 degrees therefrom. As the glass 12 passes through the pipe 20 and encounters each successive mixer element 26, it is successively sheared numerous times thereby becoming homogenized and conditioned. The simplfied shape of the mixing elements 26 allows for a substantial and effective homogenization of the glass by shearing action only, since it has been found that highly viscous materials with a Reynolds number less than about 0.1 tend to be homogenized, not by the turbulent action of mixing in a conventional sense, but by frequent shearing of the molten stream.

The mixer elements 26 are preferably fabricated of the same material as the pipe 20, are heat conductive and thereby enhance glass 12 to pipe 20 heat transfer. Heat exchange between the glass 12 and pipe 20 tends to be more rapid near where the glass 12 and pipe 20 are in contact. Thus, without the mixer elements 26 there may be a temperature gradient radially across the pipe 20. Under such circumstances the glass temperature is higher near the pipe center and a viscosity gradient occurs. Consequently glass flow is nonuniform and hot glass cores or flows more freely centrally of pipe 20. This is not desirable because homogenization is inhibited. The mixer elements 26 carry heat in the glass 12 centrally of pipe 20 radially outwardly thereof and also physically inhibit glass flow centrally of pipe 20. Thus physical and thermal homogenization are beneficially affected.

Figure 1A:
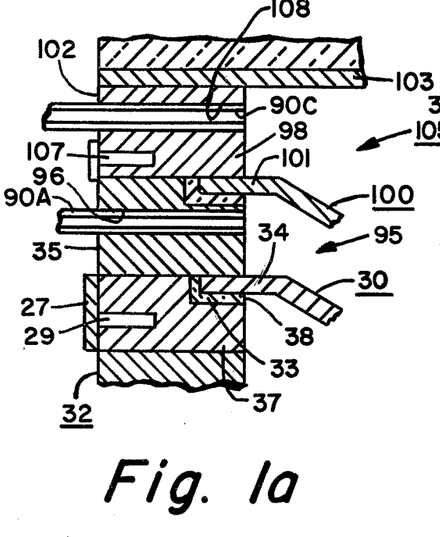
FIGS. 1a and 1b are details of cooled flange connections.
Figure 1B:
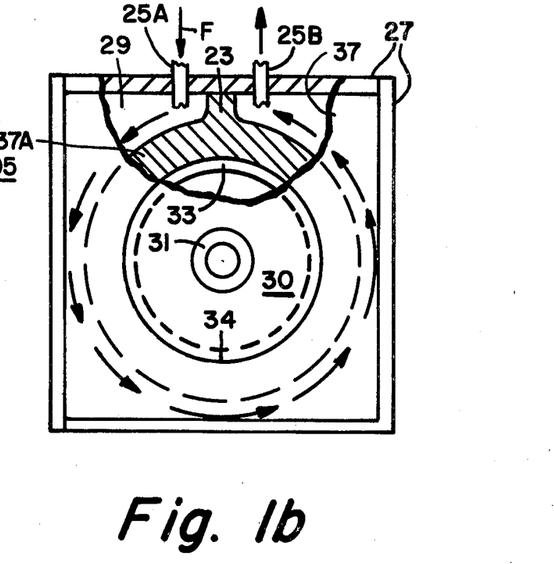

An upper flange member 30 is threaded or otherwise secured to the pipe 20 at its inboard end 31. Referring to FIGS. 1a and 1b for details, the outboard end 34 of flange member 30 is located in counter bore 33 formed in block 37 of frame member 32. Refractory rope 38 may be forced in counter bore 33 to seal the interface between the flange 30 and block 37. Block 37 has a circumferential notch 29 forming a fluid passageway in an outboard or peripheral end thereof. A web portion or partition 37a separates notch 29 from counter bore 33. The slot 29 is closed by a circumferentially secured closure plate 27. Fluid connectors 25a and 25b formed in closure plate 27 provide a respective inlet and outlet for the passageway 29. A portion of the block 37 is unslotted and forms baffle 23 extending from web 37a so that fluid flow is directed as shown by the arrows in FIG. 1b. A fluid F, preferably water, cools the block 37 and flange 30. Other flange connectors hereinafter described and noted are cooled in the same manner and will not be repeatedly described in detail. The upper flange 30 is shaped as shown to accommodate thermal stresses.

A heat exchange structure 40 is located about the pipe 20 and as shown in FIGS. 1, is made up of a plurality of heat exchange panels 42 which are removably mounted to opposed cooled sidewalls 44 by means of bolts 45. As can be appreciated from FIGS. 1, 2 and 3, each of the panels 42 are successively mounted between various ones of cross ribs 36 joining walls 44. Each panel 42 is formed with a set of parallel fluid conducting passages 46 for carrying a heat exchange fluid therein. Each passage 46 in a panel 42 is coupled serially to an adjacent one by "U" bends 47. A set of passages 46 is coupled via respective inlets and outlets 41 and 43, in flow communication with similar ones for other panels 42. An O-ring 42A located in peripheral slot 42B seals the juncture of each panel 42 with sidewalls 44 and cross ribs 34. In the present arrangement it is preferred that each set of passages 46 in each panel 42 is coupled in parallel flow communication with the other sets of passages 42. To accomplish parallel flow among panels 42 each inlet 31 thereof is coupled to a common conduit or inlet header (not shown) and outlets 43 of each panel 42 are similarly coupled to an outlet header (not shown). Such a parallel arrangement facilitates separate control of each panel 42 because each inlet 31 or outlet 43 may be independently coupled to the headers. Further, each panel 42 may be easily and independently removed from the structure 40 and replaced by another similar panel thereby facilitating the repair of the system 10.

A lower flange 50 is suitably threaded or attached to the pipe 20 at its inboard end 51. Outboard end 51A is located in a slot 61 formed between blocks 62 and 64 which are suitably secured together. Refractory rope (not shown) may be forced in slot 61 to thereby seal the interface therebetween. The flange 50 and block 62 are cooled as noted above with respect to FIGS. 1a and 1b, by a heat exchange fluid conducted through passageway 55.

Respective upper and lower flanges 30 and 50, the pipe 20 and heat exchange structure 40 are joined as hereinbefore described to define a closed chamber 53 with the pipe and heat exchange structure 40 in concentric spaced relation. The closed space 53 within heat exchange structure 40 is divided into three operative heater/heat exchange zones I, II and III. Heaters 48 are located about pipe in each zone I, II, and III.

In FIG. 3 a pair of opposed three phase cage heaters 48A and 48B such as are manufactured by GTE Sylvania are illustrated. Heater 48A detailed further in FIG. 2a has three heater elements 49A, 49B and 49C. Each heater element 49A, 49B and 49C is secured at one end to a respective or associated fluid coupler 52A, 52B and 52C by a clamp member 61A. A common or neutral strap or bus bar 61 is joined opposite or lower ends of the heater elements 49A, 49B and 49C as shown. Fluid couplers 52A, 52B and 52C each respectively carry one phase of a three phase power source 54A, 54B and 54C. Fluid couplers 52 (subscripts sometimes hereinafter omitted) are located in secured appropriately located openings 56 in each panel 42 by means of insulated bushings 57.

Figure 2A:
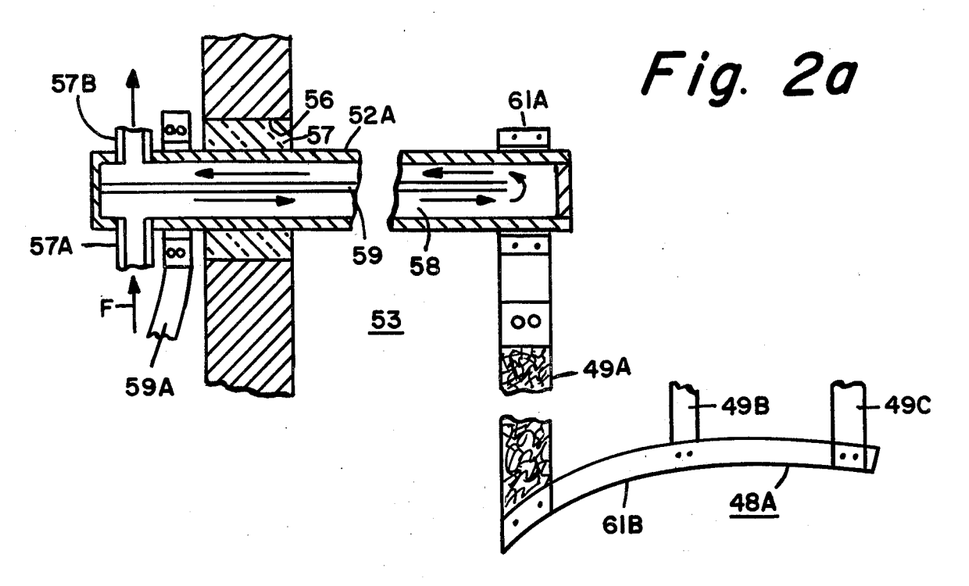
FIG. 2a is a cross-sectional detail of a cooled fluid coupler for carrying electric current.

Fluid coupler 52A detailed in FIG. 2a has a hollow interior 58 chamber with water inlets and outlets 57A and 57B and a baffle plate 59. Fluid F is passed from the inlet 57A through the interior of coupler 52A as directed by the baffle 59 to outlet 57B. The cooling provided thereby enhances support strength of the coupler 52A and protects the coupler 52A from the high temperature ambience within space 53, and the electrical joule losses caused by high currents carried by coupler 52A from the respective power source 54A. Each of the zones I, II and III has a similar arrangement of heaters 48 and fluid couplers 52, each of which may be independently controlled with respect to adjacent arrangements.

While not shown, pipe 20 may be directly connected to a source of electrical energy by means of fluid coupler 52 type devices to directly heat the pipe 20 and control temperature of the glass 12. Other arrangements of rod, ribbon, plate and Calrod ® heaters manufactured of suitable materials may be employed. An induction heater acting with the pipe 20 as a magnetic susceptor would be useful.

Each zone I–III includes a pair of opposed primary heat shields 60 (see FIGS. 2 and 3) which in the present embodiment consist of a plurality of concentric semicylindrical heat reflector members 63 separated by insulating spacer bushings 67. The members 63 of each of the heat shields 60 are mounted to panel 42 by one or more support members 65 as secured thereto by spacer bushings 67. Notches 68 accommodate the respective fluid couplers 52.

The pairs of opposed heat shields 60 in each zone completely surround or enshroud the pipe 20 with semicylindrical shielding members 63 meshing at their free ends 69. One heat shield 60 is mounted to each panel 42 along with three fluid couplers 52 and one heater 48. Thus a pair of opposed panels 42 may be removed in each zone along with a heat shield 60, heater 48 and fluid couplers 52 as a modular unit.

Secondary heat shields 70A, 70B, . . . 70N are provided as illustrated in FIG. 1 to complete a radiation barrier in the space 53. The first two (70A and 70B) are located within the space 53 at or near respective upper and lower flanges 30 and 50, and the latter mentioned shields . . . 70N are located intermediate the primary shields 60. Each of the secondary heat shields 70A . . . 70N include semicylindrical heat reflecting members 71 oppositely intermeshed in the same manner as the primary shields 60 hereinbefore described and mounted to the respective cross ribs 36 by means of at least one support 65 and a spacer bushing 67.

In order to fully enshroud the pipe 20 the primary and secondary heat shields are aligned as closely as possible axially thereabout. Axial free ends 72 of the shields 60 and 70 are arranged as shown with the primary shields 60 being lapped or stepped over the secondary shields 70 so that the panels 42 and shields 60 carried thereby may be removed. The lapped arrangement accommodates thermal expansion of pipe 20 and insures that as the pipe expands it is always lengthwise enshrouded.

The various heat shield members 63 successively absorb, reradiate and reflect energy in the form of radiation R1 emitted from pipe 20. Radiation R1 is reflected as R1' and reradiated as R2 as it encounters the heat shield 63 closet pipe 20. Similarly, as energy is outwardly reradiated successively as R2, R3, . . . Rn, some is eventually lost as RL to heat exchange structure 40, and some e.g. R1', R2'. . . Rn' is reflected towards pipe 20. Note that multiple reflections and reradiations are not detailed, or is the influence of convection and conduction, which are believed to be readily apparent.

The apparatus of the present invention is susceptible to thermal expansion and contraction by virtue of the temperature of the molten glass 12 passing therethrough. Although various means may be provided for accommodating thermal expansion of the system 10, a double bellows and floating flange arrangement is preferred.

The delivery system 10 is suspended beneath the furnace 11 and attached to the connector 13 by a sleeve or threaded connection at inlet 22 of pipe 20. The latter is suspended within the outer heat exchange structure 40 by means of the upper flange 30 resting on block 37 as hereinbefore described. The sidewalls 44 of the heat exchange structure are each welded or bolted along an inboard end 84 to side brackets 83, which in turn are fixed to a suitable support structure (not shown) at their outboard ends 85.

The lower end or outlet 24 of pipe 20 is secured via flange 50 between the blocks 62 and 64 as hereinbefore described. The block 62 is joined to a lower block 88 of sidewall 44 via an upper bellows 89. Thus, the pipe 20 may expand in a thermal cycle and move downwardly while bellows 89 accommodates the motion and maintains closure of the space 53. Lower bellows 120, detailed further on herein, accommodates downward motion of block 64 and flange 50.

Flanges 30 and 100 are leaf spring shaped in radial profile to accommodate thermal expansion both circumferentially and axially. There is a relatively high radial thermal gradient across each of the flanges 30 and 100 because they are each positioned near the furnace outlet 13 where the glass 12 is relatively hot. The flanges 30 and 100 are relatively flexible and capable of accommodating the high thermal gradients. Flange 50 may also accommodate thermal expansion, but since it is joined at its outboard end 51A to movable block 64, it has a simplified support arm like profile. Flange 50 may be heavier than flanges 30 and 100 because it must carry a greater proportion of the pipe load. In addition the flange 50 is normally less flexible than the upper flanges 30 and 100. This is because the flange 50 is located at the outlet 24 of the pipe 20 where the glass 12 has been conditioned and cooled. Thus, thermal gradients across the flange 50 tend to be less severe.

A fluid supply line or purge line 90 is located in an opening 92 of block 88 for allowing the introduction of a purge gas P within the space 53 and to other locations as hereinafter described. As mentioned earlier it is preferable that the pipe 20 be manufactured from molybdenum because of its high temperature strength and glass corrosion resistance. Upper and lower flanges 30 and 50 are also preferably made of moly for the same reasons. Further, heaters 48 are preferably manufactured from tungsten or moly mesh because of superior high temperature characteristics. Knowing that the moly and tungsten are susceptible to oxidation at temperatures above 550° C., some inert or reducing atmosphere is provided in order to inhibit any oxidation of the moly and/or tungsten components. Thus purging is essential when these preferred materials are used. Other materials might be utilized if desired, and depending upon their composition, different atmospheres including ambient might be utilized. For example platinum could be useful for the pipe 20 and heaters 48 with ambient or otherwise nonreducing atmosphere in the space 53. In a relatively low temperature system, e.g. below 1100° C., steel and steel alloys may also be useful for various components including those in contact with the glass 12.

Portions of the respective upper and lower flanges 30 and 50 outside of the space 53 appear to be open to the ambient atmosphere. However, secondary purge lines 90A–90C are provided to carry purge gas to the various delivery system components as well as portions of the pipe 20 outside of the space 53. For example, a space 95 above upper flange 30 is fed by line 90A via opening 96 in block 35. Similarly space 97 below flange 50 is purged by gas supplied by line 90B via opening 198A in block 198.

Proportional mixing valve 91 is adapted to couple purge line 90' to purge line 90 for introducing a second purge fluid P' into space 53. Fluid P' may be another gas having a specific heat or heat capacity different than purge fluid P. This feature allows for control of the heat exchange within the space 53 by controlling the proportions of P+P'.

Control of the heat exchange value of purge gases P and P' could also be accomplished by varying or adjusting the volume, pressure or flow rates of the gases and the like. Such adjustments may be made relatively quickly with conventional metering equipment not detailed herein. Consequently the heat exchange value of the gases P and P' may be quickly adjusted to changing conditions. The heat exchange between the glass 126 in pipe 20 and the purge gases P and P' may thus be changed to a desired rate without significant thermal inertia; or otherwise stated, the time required to change from one heat exchange value to another is insignificant when compared to the time required to significantly change the temperature of the glass 12. In addition it could be possible to draw a vacuum through purge line 90 to evacuate the space 53 and thereby create an insulated chamber about the pipe 20. Evacuation of other spaces such as 97, 95 and 105 is probably not necessary although it could be accomplished in a similar manner if desired. Of course natural or free convection of gas P occurs within chamber 53. It is also possible to provide forced convection within chamber 53 by the recirculation of purge gas P. It should be understood that the system is versatile and may be operated according to various control schemes to provide a desired result.

The use of various purge gases P and P' allows the system to be operated in such a way that heat exchange properties or insulation value thereof may be changed or varied in response to changes in the temperature of the glass 11. Thus the space 53, depending on its contents, acts as a variable insulation blanket about pipe 20, thereby adding another dimension of control and versatility to the system. The rate of heat removed from pipe 20 could be adjusted from negligible levels to extremely high rates in the order of 15 kw/ft$^2$ or expressed in terms of temperature drop °C./ft. along pipe 20 at rates as high as 100° C./ft. This is significant since the temperature of the material 12 may be in excess of 2100° C. at the inlet end 22 of pipe 20. At the high temperatures contemplated herein, purge gas P must be maintained free of contaminants such as $O_2$, $H_2O$, $CO_2$ and CO. Commercially available gas purification equipment, not detailed herein, is capable of removing the aforementioned exemplary compounds as well as other materials as required.

It should be appreciated that the voltage applied to the various heaters 48 should be less than the ionization potential for the gas or gases nearby. Otherwise the gas will become conductive and provide a short circuit path from the particular heater or heaters to adjacent conductive structures which may be at a different electrical potential. The ionization potential of a gas is primarily a function of temperature and/or pressure. The former only be monitored by means of one or more thermocouples 125 and the latter by pressure gauge(s) 127.

In an upper part of the system 10 the furnace connector 13 is supported within a recessed opening 99 of furnace bottom 103 by a flange 100 having an outboard end 101 carried between blocks 35 and 102. The opening 99 and connector 13 define an annular space 104 therebetween, and furnace bottom 103 together with blocks 35 and 102 and flange 100 form a trap 105 contiguous with space 104. A heater 106, concentric with connector 13, is coupled to a source of power via connector 106' (similar to the arrangements for heaters 48).

The furnace bottom 103 is preferably in the form of a steel bottom support plate and is provided with a glass contact refractory layer 109 immediately thereabove. A moly shield, not shown, may be used to protect refractory 109 (see Ser. No. 243,811). For added life, opening 99 formed in bottom 103 may be lined with refractory blocks 111 formed of zircon.

In order to further enhance furnace life an insulation sandwich structure 130 is provided within opening 99 of furnace bottom. The structure 130 includes a pair of concentric radiation shields 132 and insulating felt 134 located therebetween in space 135. The shields are joined at lower margins 136 by an annular bridging member 138 and likewise at upper margins 140 by bridging flange 142 to close space 135. Sealing or joining of the components may be accomplished by means of rivets (not shown) and plasma spraying of the joints. The space 135 should thus be glass tight but permeable to gas. Preferably the shields 132, annular sealing member 138, and annular sealing flange 142 are fabricated from moly. During startup, purge gases will protect the moly from oxidation. The space 135 between the shields 132 is not air tight, and thus purge gas from space 105 will infiltrate and protect the moly parts. Due to the combined behavior of radiation shields 132 and insulating felt 134, the zircon refractory blocks 111 in opening 99 of furnace bottom 103 will operate several hundred degrees centigrade cooler than the connector 13 which, in a preferred embodiment, may be as closely spaced as ½ inch therefrom. The insulation felt 134 is a material such as zircon felt and is sometimes known as a super insulation for high temperature applications. It is within the scope of the invention that if desired, the insulation felt 134 could be used intermediate the individual heat reflector members 63 forming the heat shields 60 described hereinbefore. By such an arrangement the heat shields 60 would also act as super insulators.

The heater 106 referred to above is preferably a tungsten or moly mesh device commercially available from GTE Sylvania and is used as a start up heater to melt cullet (not shown) located in connector 13, annular space 104 and trap 105. The purpose of cullet is twofold. First on start up, cullet melts quickly and protects the moly components, and secondly the molten glass forms a seal in trap 105 for furnace bottom 103. A circumferential fluid carrying slot 107 (FIG. 1a) in block 102, similar in operation to that described in FIGS. 1a and 1b for block 37, cools the outboard end 101 of flange 100, the block 102 and closely adjacent portions of furnace bottom 103. The cooling provided thereby freezes some of the glass 12 in trap 105 to provide a secure seal near block 102 and furnace bottom 103. Purge line 90C provide purge gas P to trap 105 via opening 108 in block 102. During start up the purge gas P provides an added measure of protection to oxidizable components. After start up purge gas P is normally unnecessary and may be shut off by a suitable valve (not shown).

A downstream device such as a forehearth or forming device 16 includes an inlet opening 110 therein. Connector 14 is concentrically located therein and forms therewith an annular space 114. Heater 112, preferably moly mesh similar to heater 106 referred to above, is located about connector 14 in space 114 and is coupled to power by coupler 113 in the manner of heaters 48. The space 97 below lower flange 50 is defined by lower bellows 120, floor 121 of device 16 an annular refractory cylinder 115 resting on floor 121, and flange 50.

Glass 12 flowing from furnace 11 through upper connector 13, pipe 20 and lower connector 14 to device 16 exhibits a significant hydrostatic head at outlet 117. It therefore tends to flow upwardly about connector 14 into annular space 114 and space 97 via an upper end 116 of cylinder 115. The glass 12 in spaces 114 and 97 protects the oxidizable components and forms an upper seal for the device 16. During start up, purge line 90B provides gas P to space 97 via the opening 198A in block 198 for purposes hereinbefore noted. The block 198 rests on floor 121 to seal space 97 and is cooled by fluid in passageway 118 thereby freezing the glass 12 adjacent thereto within space 97. Fluid passage 55 in block 64 performs a similar function.

Lower bellows 120 is located between blocks 64 and 198 and allows flange 50 to float free and move downwardly and upwardly as pipe 20 expands and contracts. Thus respective upper and lower bellows 89 and 120 cooperate to provide a free floating flange 50 which maintains respective spaces 53 and 97 closed or sealed with respect to one another. A refractory mesh shroud 124 is located between blocks 64 and 198 to shield the inside surface 122 of bellows 120 from contact with glass 12, thereby keeping the convolutions thereof free of the obstruction of frozen glass should the system become sufficiently cool in that region. The provision of the refractory mesh 124 is especially beneficial in start up, since it is important that the bellows 120 remain free to expand and contract. The shroud 124 is fabricated from a glass contact material and thus is resistant to corrosion. Upper bellows 89 and lower bellows 120 are commercially available and are preferably manufactured of inconel.

It can be appreciated that the heat exchange structure 40 and pipe 20, which form the major components of the delivery system 10, may be readily separated from the furnace connector 13 without significantly disturbing the furnace 11. The delivery system is similarly easily separated from outlet connector 14. In the event the heat exchange structure 40 is to be separated from the respective upper and lower connectors 13 and 14, the device 16 may be lowered out of position by means of movable supports 123, thereby separating floor 121 from block 198. Connector 14 could thereafter be unsleeved from pipe 20 and moved away. Likewise the heat exchange structure 40 could thereafter be separated at blocks 35 and 98 and unsleeved from connector 13 at the upper end 22 of pipe 20. The construction of the system, being modular, prevents the necessity of destroying the adjacent structures during removal for repair. Movable supports 123 may be adjusted to accommodate thermal expansion on start-up by a screw jack or the like (not shown). Such thermal expansion accommodation may be automatically controlled. In the event of power failure thermal contraction would be rapid, and notwithstanding the presence of bellows 89 and 120, the lower block 198 of the heat exchange structure 40 could separate from floor 121 of device 16. Thus automatic or manual control of the position of device 16 carried by supports 123 would be preferred. The position of heat exchange structure 40 relative to device 16 could be determined by means of a commercial dial gauge 129 coupled between block 88 of the heat exchange structure and movable support 123 of the device 16.

FIGS. 1 and 4 show details of each side wall 44 which includes a pair of respective spaced inner and outer wall plates 131 and 133, upper and lower blocks 37 and 88, and side closure plates 135. Full baffles 137 are located between the plates 131 and 133 to create separate chambers 138 for circulation of cooling fluid flow in each zone I, II and III. Partial intermediate baffles 139 located between plates 131 and 133 create a tortuous path for a cooling fluid F. Outside wall 133 has through openings 141 for respective inlet and outlet pipes 134 and 136 for each zone. Cooling fluid F flows into pipe 134, around intermediate baffle 139, and out through outlet pipe 136 to cool that portion of the sidewall 44 for each respective zone (see arrows). This control of each zone of a sidewall 44 is similar to the control of panels 42.

The system 10 of the present invention operates as follows. Hot molten thermoplastic material such as glass 12 is supplied at the inlet end 22 of the pipe 20 via connector 13. As it passes through the pipe 20 the mixing means 26 successively shear and reshear the glass 12 thereby homogenizing the glass 12 both physically and somewhat thermally. As the glass 12 passes through the pipe 20 it gives up heat to the surrounding space 53. A significant portion of the heat is reflected back on the pipe 20 by the respective primary and secondary heat shields 60 and 70A ... 70N so that, in conditioning the glass energy is conserved and the amount of heat necessary to regulate the temperature of the glass 12 is minimized. Heaters 48 are supplied with electrical energy for successively controlling the temperature of the glass 12 as it passes through the pipe 20. In the event the temperature of the glass 12, as sensed by one or more strategically placed thermocouples 125, is different from that desired, electrical energy may be supplied to one or more of the heaters 48 in each of the respective zones I, II and III. The flow of fluid F and purge gas P may be regulated for each zone I–III to further affect homogenization. Thus, as the glass 12 progresses through the pipe 20, temperature controls (not detailed) are managed so that it leaves the outlet 24 at a desired temperature, viscosity, and consistency. Temperature control is achieved by means of regulation of purge gas P and fluid F flow as well as heater 48, 106 and 112 voltages. This may be accomplished manually by values for gas and other fluids and rheostats/potentiometers for the electric voltages. A conventional computer drive process control system may be used if desired to operate such hard ware.

It should be appreciated from the above that the control scheme of the present system is redundant and modular in concept. Failure of any one or more components will not result in the total shutdown of the system. For example if one of the heaters 48 in any of the zones I, II or III fail, there are other separately powered heaters available to supply heat energy for conditioning the glass. In the event one or more of the system components fails, a panel 42 containing the failed part may be easily removed and a new panel readily replaced without causing a lengthy system shutdown. Oxidizable components are protected by an efficient relatively air tight system utilizing purging gas and glass contact seals, and the system is provided with means for supplying startup energy by means of heaters 106 and 112. Repair or removal of the entire system is facilitated by the modular design of the heat exchange structure 40.

It should be noted that although molybdenum is a preferred material for certain components, e.g. pipe 20, mixer elements 26, flanges 30, 50 and 100, heaters 48, 106 and 112, shields 60 and 70, etc., other materials or alloys thereof may be useful such as tungsten, tantalum, columbium and rhenium. Although these may be more expensive than moly they are refractory materials worthy of consideration. In order to protect the oxidizable components from deterioration in the presence of highly oxidized glasses, e.g. lead glasses, it is possible to DC bias the pipe 20 to provide cathodic protection for the moly. An electrode (not shown) in the furnace 11 could be positively biased with a DC potential and used as a sacrificial electrode relative to the DC biased pipe 20. Also, noble metal and alloys thereof such as platinum or rhodium may be useful in an environment having high oxygen content.

While there has been described what at present are considered to be the preferred embodiments of the invention, it will be obvious to those skilled in the art that various changes and modifications may be made therein without departing from the invention, and it is intended in the appended claims to cover all such changes and modifications as fall within the true spirit and scope of the invention.

I claim:

1. A furnace delivery apparatus for conditioning relatively hot molten thermoplastic material by controlled dissipation of heat energy therefrom comprising: pipe means for delivering said thermoplastic material from a source thereof to a desired location and for conditioning said material to a desired homogeneity and temperature upon delivery, said pipe means including a pipe having an inlet for receiving said material therein from said source and an outlet for discharging said conditioned material at said desired location; shell means located about said pipe means and defining a closed chamber which surrounds said pipe and extends between said pipe and said shell means, said shell means having fluid passageways extending therethrough for the circulation of a heat exchange fluid therein; and at least one radially spaced apart radiation heat shield means located within said closed chamber and surrounding said pipe for reflecting back to said pipe heat radiated therefrom for controlling heat loss from the pipe.

2. A furnace delivery apparatus as defined in claim 1 including means for protecting surfaces of said shell and said pipe which form inside surface portions of said chamber from deleterious ambience including passage means for supplying said chamber with a purge fluid relatively inert with respect to the shell and pipe and alternatively for providing a near vacuum within said chamber.

3. A furnace delivery apparatus for conditioning molten thermoplastic material comprising: a pipe having an inlet for receiving thermoplastic material from a furnace and an outlet for delivering said material therefrom at a desired homogeneity;

a heat exchange structure disposed in spaced relation about said pipe and forming a closed chamber therebetween;

at least one radiation heat shield means radially spaced apart from and surrounding said pipe for reflecting a portion of heat within said chamber towards said pipe for controlling heat loss from the pipe;

means for circulating a first fluid in said heat exchange structure in heat exchange relation with the closed chamber; and heater means located proximately about the pipe for providing heat input to said pipe at selected locations thereabout;

said heater means, said means for circulating the fluid within said heat exchange structure and said radiation heat shield means functioning in combination to provide means for governing the temperature of the thermoplastic material to the desired thermal homogeneity as it passes through said pipe.

4. A delivery apparatus as defined in claim 3 including stationary shearing means located within said pipe for homogenizing the consistency of the thermoplastic material passing therethrough.

5. The delivery apparatus of claim 3 wherein said closed chamber includes at least one inlet for the introduction of gaseous heat exchange fluid therein for regulating heat removal from said pipe.

6. The delivery apparatus of claim 5 including means in communication with the gaseous heat exchange fluid for regulating at least one of pressure, temperature and flow rate of said fluid.

7. The delivery apparatus of claim 5 wherein said heat removal is variable from relatively negligible rates to relatively high and fast rates in the order of 15 kilowatts per square foot of pipe surface.

8. The delivery apparatus of claim 7 wherein said gaseous heat exchange fluid has a relatively low thermal inertia relative to the thermoplastic material.

9. The delivery apparatus of claim 3 wherein said heat exchange structure includes control means for introducing at least two gaseous heat exchange fluids into said chamber.

10. The delivery apparatus of claim 9 wherein said gaseous heat exchange fluids have different heat capacities and said control means comprises a proportional mixing valve for regulating the amounts of each fluid introduced into said chamber for controlling heat exchange therein.

11. The delivery apparatus of claim 3 further including means for evacuating the closed chamber to a relatively low partial pressure for regulating heat removal therein.

12. The delivery apparatus of claim 3 wherein said pipe is fabricated from the group consisting of noble metals, oxidizable refractory metals and steels and alloys thereof.

13. The delivery apparatus of claim 3 wherein said pipe is an oxidizable refractory metal selected from the group consisting of molybdenum, tungsten, tantalum, columbium and rhenium.

14. The delivery apparatus of claim 3 wherein said first heat exchange fluid is a liquid.

15. The delivery apparatus of claim 3 wherein said heater means includes an inductive heater located proximately with said pipe for providing heat input into said pipe at selected locations thereabout, said pipe acting as a magnetic susceptor in combination with said induction heater means.

16. The delivery apparatus of claim 3 wherein said heater means includes means for electrically imposing an energizing voltage thereon said voltage being limited by an ionization potential of surrounding ambience thereof.

17. The apparatus of claim 3 wherein said heater means includes a portion of said pipe being connected with a source of electrical power.

18. The delivery apparatus of claim 3 including expandable means in communication with at least one end of said heat exchange structure being adapted to accommodate relative motion of the pipe and heat exchange structure through thermal cycling of the apparatus.

19. The delivery apparatus of claim 18 wherein said expandable means comprises a bellows being coupled between the pipe and the heat exchange structure.

20. The delivery apparatus of claim 18 wherein said expandable means includes at least one flange extending from the pipe to the heat exchange structure having a profile for accommodating at least one of circumferential expansion of the flange and axial expansion of the pipe.

21. The delivery apparatus of claim 3 including a flange portion supportively coupled about each of the inlet and outlet of said pipe, each flange extending radially outwardly from said pipe and in communication with said heat exchange structure for sealingly closing the chamber.

22. The delivery apparatus of claim 21 including flange cooling means located in thermal communication with at least a radial circumferential extremity of said flange portion.

23. The delivery apparatus of claim 3 wherein the heat exchange fluid in flow communication with said heat exchange structure is selectively circulated within fluid openings therein for governing heat removal from said thermoplastic material.

24. The delivery apparatus of claim 3 wherein said heat shield means includes a plurality of cylindrical concentric members axially supported about the pipe.

25. The delivery apparatus of claim 24 wherein said heat shield means includes a pair of opposed semicylindrical members having free ends in an overlapped configuration.

26. The delivery system of claim 24 wherein said heat shield means includes a plurality of axially overlapping concentric semicylindrical members.

27. The delivery system of claim 26 wherein axially alternate ones of said semicylindrical members are fixed relative to the pipe and intermediate ones are radially movable relative thereto.

28. The delivery system of claim 3 further including connector means between a recessed outlet of the furnace and the inlet of the pipe for containing melted thermoplastic material comprising; a connector pipe member axially located within the recessed outlet of the furnace and spaced from bounding walls of the recessed outlet to define a space therebetween, means extending from a distal portion of the connector pipe for sealably engaging a peripheral boundary of the furnace outlet, and heater means surrounding the connector pipe within the defined space for heating thermoplastic material in the vicinity thereof.

29. The delivery system of claim 28 wherein the means for sealably engaging the outlet comprises a flange sleeved about the connector pipe and having a radial peripheral edge secured to an exterior peripheral portion of the outlet opening.

30. The delivery system of claim 29 including cooling means proximately located about said flange for cooling said radial peripheral edge thereof.

31. The delivery system of claim 3 wherein the heat exchange structure includes a bellows portion for allowing the pipe outlet to move axially relative to the heat exchange structure.

32. The delivery system of claim 31 further including a shroud annularly located intermediate the bellows and pipe for shielding the bellows from contact with thermoplastic material.

33. The delivery system of claim 3 further including insulating means concentrically located about the pipe for establishing a relatively high temperature differential radially thereof.

34. The delivery system of claim 33 wherein said insulating means comprises at least two concentric spaced heat shields and a refractory blanket located therebetween.

35. The delivery system of claim 34 wherein opposite axial free ends of the shields are joined for closing the space therebetween.

36. The delivery system of claim 35 wherein at least one end of the heat shields includes a radially extending flange for engagement with a portion of the furnace outlet for supporting the insulating means therewithin.

37. The apparatus of claim 3 wherein said heat exchange structure is adapted to be mounted in flow communication with at least one of a plurality means for forming, melting and conveying thermoplastic material and further comprises means for gauging the relative positions of said delivery system relative to at least one of said plurality of means.

38. A method of conditioning relatively hot molten thermoplastic material comprising the steps of: confining the material to a selected flow path, conducting the material along said flow path from an inlet end to an outlet end thereof, selectively regulating the rate of heat energy dissipation from the material along said path including the step of radiation heat shielding the material from heat loss along said path and at least one of the steps of heating the material along said path and heat exchanging and removing heat energy given up by said material along said path.

39. The method of claim 38 further comprising the steps of: surrounding the portion of the flow path with a concentric annular closed chamber having wall portions in spaced relation with the flow path wall portions, defining a closed space within said chamber and performing the heat shielding step proximately of the flow path within said space.

40. The method of claim 39 further comprising the step of: performing the heat exchange step proximately the boundary walls of said chamber.

41. The method of claim 39 further comprising the step of introducing at least one gaseous substance into said closed space.

42. The method of claim 41 comprising the step of heat exchanging heat energy given up by said material with said gaseous substance.

43. The method of claim 42 further including the step of circulating said gaseous substance within said closed space for controlling the rate of said heat exchange step with said gaseous substance.

44. The method of claim 43 further including regulating the rate of introduction of said gaseous substances introduced into said closed space for controlling the heat exchange capacity thereof.

45. The method of claim 41 wherein introducing gaseous material further comprises the step of gaseously shielding said flow path from substances deleterious thereto.

46. The method of claim 39 further including the step of reducing substantially the partial pressure within said closed chamber for regulating convection and conduction of heat dissipation therewithin.

47. The method of claim 38 wherein the step of regulating the rate of heat energy dissipation further includes the step of delivering the material from the outlet of said path at a relatively uniform cross sectional temperature distribution.

48. The method of claim 47 further including the step of introducing said hot material at the path inlet at relatively nonuniform temperature distribution across said path and wherein the temperature of the material introduced is relatively hot up to about 2100° C.

49. The method of claim 38 wherein the step of heating the material along said path further includes the step of selectively introducing heat energy uniformly about the path.

50. The method of claim 38 further including the step of physically shearing the material as it flows along the path for physically homogenizing same and regulating heat dissipation therefrom.

51. The method of claim 38 further including the step of accommodating thermal expansion of the path relative to the inlet and outlet ends thereof.

52. The method of claim 38 further including at least one of the steps of radially impeding the flow of said material along said path and radially removing heat from said material across said path.

53. The method of claim 38 wherein the step of heating the material includes melting the material from an initial relatively cold and solid condition.

54. The method of claim 38 further including the step of providing a connection with at least one of an inlet and outlet of the path and heating said connection about a proximate outward location thereof.

* * * * *